Jan. 14, 1964 W. A. MESSMER 3,117,527
GEAR PUMP THRUST VALVE

Filed May 22, 1962 3 Sheets-Sheet 1

INVENTOR.
WILBERT A. MESSMER
BY William D. Carothers
HIS ATTORNEY

Jan. 14, 1964 W. A. MESSMER 3,117,527
GEAR PUMP THRUST VALVE
Filed May 22, 1962 3 Sheets-Sheet 2
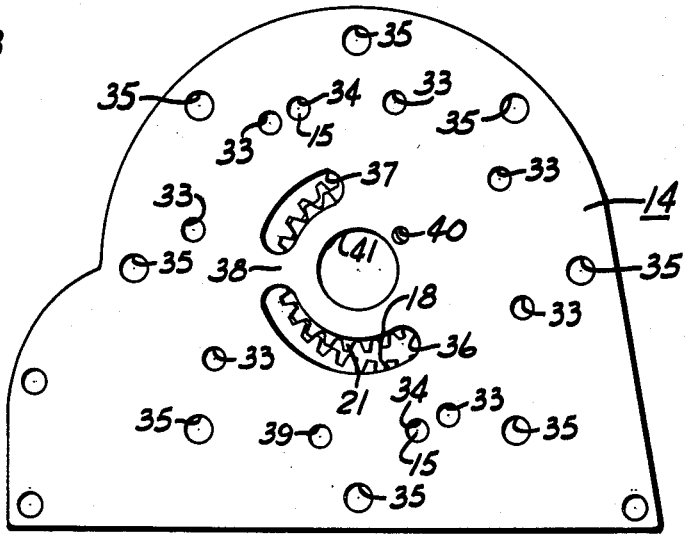
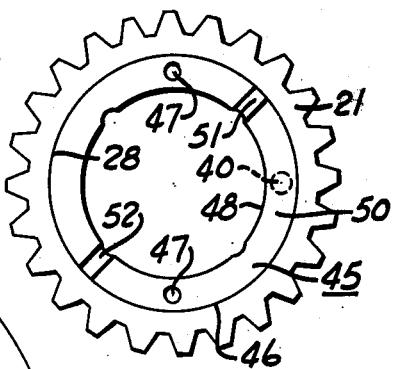
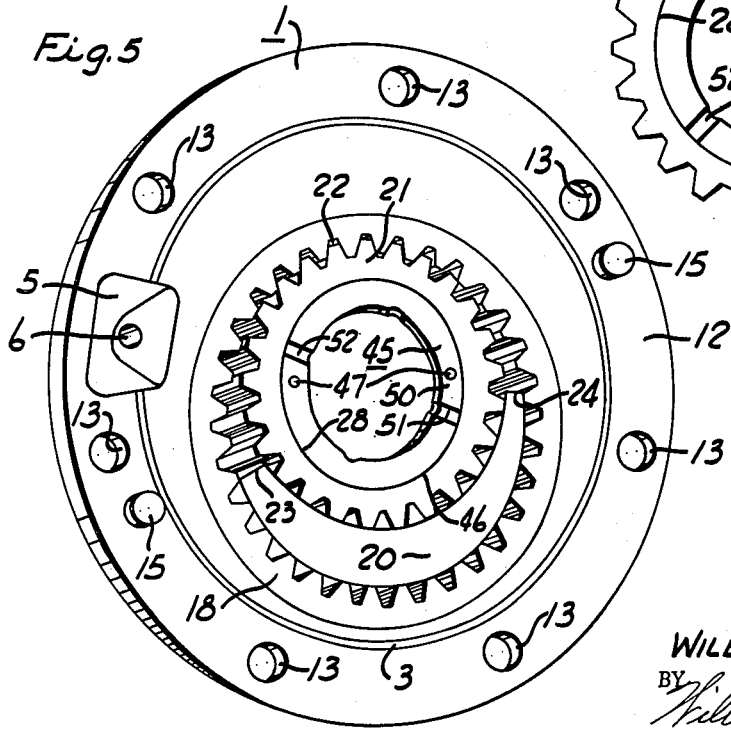
INVENTOR.
WILBERT A. MESSMER
BY William D. Carothers
HIS ATTORNEY Jan. 14, 1964 W. A. MESSMER 3,117,527
GEAR PUMP THRUST VALVE
Filed May 22, 1962 3 Sheets-Sheet 3

INVENTOR.
WILBERT A. MESSMER
BY William D. Carothers
HIS ATTORNEY

United States Patent Office 3,117,527
Patented Jan. 14, 1964

3,117,527
GEAR PUMP THRUST VALVE
Wilbert A. Messmer, 3613 Harbison Ave.,
Pittsburgh 12, Pa.
Filed May 22, 1962, Ser. No. 196,834
4 Claims. (Cl. 103—126)

This invention relates generally to pumps and more particularly to gear pumps for use in automatic transmissions.

Automatic transmissions may be provided with one or more gear pumps, which gear pumps are ordinarily mounted in axial alignment with and adjacent to the torque converters of the automatic transmissions for automobiles. The pumps ordinarily used for these automatic transmissions are internal gear pumps employing a large gear with internal teeth and a small gear with external teth that mesh therewith and is mounted eccentric thereto, the intervening space being filled with a crescent that is formed from one part of the pump housing in the form of a casting which includes a pump chamber. The other half of the pump housing is a flat plate that abuts against the casting, both gears, and the crescent to close the chamber. This plate is provided with an inlet at one end of the crescent and an outlet at the opposite end of the crescent, the inner meshing teeth of gears forming the abutment seal between the inlet and the outlet. The inlet is usually slightly larger than the outlet and both of these ports are arcuate and expose the teeth just as they are coming out of engagement with each other adjacent the inlet port and just as they are entering in interengagement with each other adjacent the outlet port. The inner arcuate edges of these ports are substantially aligned with the routes of the grooves of the external gear. However, they expose a generous portion of the teeth in the internal gear. An abutment is formed in the plate that covers the fully meshed portion of the teeth and substantially half of the external gear is covered by the plate from the inlet port around the crescent to the outlet port. Even though this portion of the plate covers substantially half of the external gear the abutment of the plate that covers the fully meshed portion has its center disposed at approximately 70° from the opening edge of the outlet port and the closing of the outlet port extends for approximately 56°. Diametrically opposite to this position is a pressure regulator valve and pump lubricant exhaust port which exhausts all of the oil being pumped by the gears after being discharged from the pressure regulating valve. All of the converter oil must pass through exhaust port in the plate that encloses the pump and thence to the converter through the tubular converter hub shaft that drives the external gear. The center of this exhaust lubricant port is approximately ¾ inch from the center of rotation of the shaft, whereas the inner arcuate surface of the inlet and outlet exhaust ports are approximately 1¼ inches from the same axial center.

The external gear is provided with an internal bore that allows this exhaust port to be open to the central converter tubular hub shaft in the gear pump through which the oil flows to the converter, but on its opposite or outer side any leakage oil is lead by a manifold to the return sump of the pump. Thus the oil being discharged through this opening is open directly to the interior of the tubular converter hub shaft portion extending through the gear and the outer surface of this tubular converter hub shaft is subjected to the seal that is carried by the housing containing the pump chamber. On the opposite side of the plate that closes the pump chamber any leakage oil is directed to the sump.

This lubricant and pressure regulated oil from the exhaust port, although of considerable dimension, if restricted, will starve the converter, but if permitted to remain open as designed it wil permit the exhaust pressure on the external gear to wear in the plate creating a short circuit in the pump and causing substantial loss in the generation of fluid pressure preventing the vehicle from having power of locomotion. The wearing by this gear in the plate is quite noticeable even within one hundred miles if the shaft happens to be mounted slightly askew to the housing of the gear pump. If the shaft is relatively straight, the wear may not be so pronounced, but it will, within time, produce a short circuit in the pump causing the same to fail.

The principal object of this invention is the provision of a valve means secured to the gear for the purpose of valving the opening of the lubricant and pressure regulated oil from the exhaust port in the fluid pumps of automatic transmissions which will allow sufficient or regulated flow of fluid through the exhaust port to alleviate a high pressure against the external gear within the gear pump but at the same time produce a pulsating action by the gear on the plate so as to provide a clearance for the reception of oil and prevent the gear from wearing on the plate.

Another object of this invention is the provision of a lubricant and pressure regulated oil from the exhaust port valve that will create pulsations in the discharge of oil for the purpose of maintaining a floating action of the gear and thereby prevent wear. This floating action not only alleviates wear on the plate side between the inlet and outlet ports but also aids in the alleviation of wear in the opposite side of the housing engaged by the gears.

Another object is the provision of a thrust bearing providing lateral grooves which function as a valve in controlling the flow of lubricant through the exhaust port in the side plate of a gear pump.

Other objects and advantages appear hereinafter in the following description and claims.

The accompanying drawings show for the purpose of exemplification without limiting the invention or claims thereto, certain practical embodiments of the invention wherein:

FIG. 3 is a plan view of the front pump cover plate closing the pump chamber.

FIG. 5 is a perspective view of the pump chamber having the gears and the tubular shaft in place showing the valve means on the external gear.

FIG. 6 is a plan view of the external gear carrying lubricant exhaust port valve.

Figure 1:
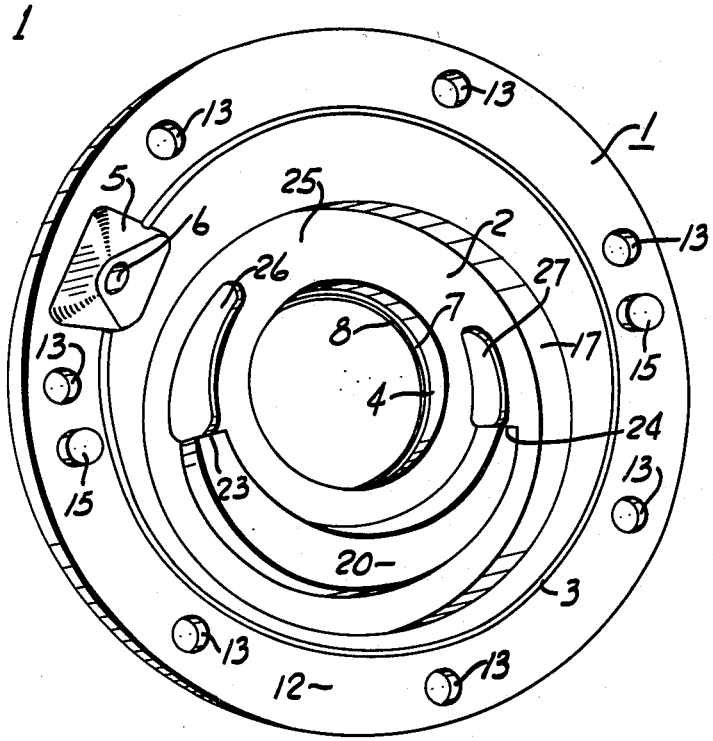
FIG. 1 is a perspective view of the open pump chamber in the pump housing.
Figure 2:
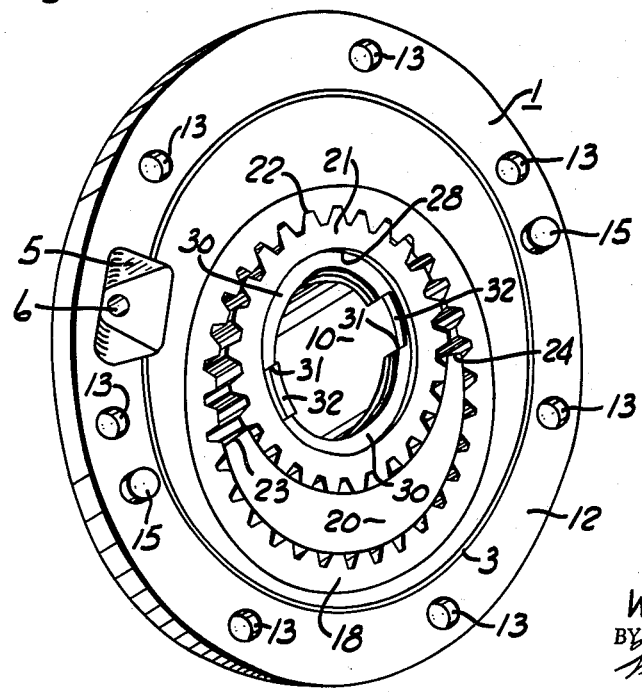
FIG. 2 is a perspective view of the open pump chamber having the gears and the tubular shaft in place which protrudes from the torque converter stator.

Referring to FIG. 1 the pump housing 1 is provided with a pump chamber 2 which is encircled by the lubricant groove 3 that is concentric to the central shaft opening 4 and is provided with the sump 5 which interrupts the lubricant groove 3 and collects the lubricant therefrom as well as from the hole 6 and the groove 7 that is within the bore 4. The end of the bore is provided with a lubricant seal 8 which will engage the tubular shaft 10 as illustrated in FIG. 2 and prevent the lubricant from travelling into the external part of the pump chamber 2. The tubular shaft 10 is a hub shaft extending from a converter located ahead of this front pump chamber 2. The perimetral flange 12 of the pump housing 1 is concentric with the bore 4 and is provided with a series of bolted holes 13 for securing the front pump cover plate 14 illustrated in FIG. 3. The flange 12 is also provided with the guide pins 15 which are disposed diametrically opposite to each other for reception in the guide holes 34 of the plate 14.

The pump chamber 2 has an annular wall 17 which is eccentric to the bore 4 but is circular to receive the internal gear 18, the teeth of which mate in sealing engagement with the exterior or outer arcuate surface of the crescent 20. The inner arcuate surface of the crescent 20 provides a mating abutment for the teeth on the external gear 21 which mesh with the teeth of the internal gear at the position indicated at 22 as shown in FIGS. 2 and 5. The opposite sides or faces of the gear 21 include the gear teeth ends and the solid circular portion. The latter represents the hub section or hub face that surrounds the bore 28 which contains the inturned arcuate segments 30.

The crescent 20 has a heavier end 23 adjacent the inlet of the pump and a smaller end 24 adjacent the outlet of the pump. These represent the ends of the abutting surfaces of the crescent with the teeth of the internal and external gears. The bottom 25 of the pump chamber 2 is provided with a recess 26 which extends to the end 23 of the crescent 20 adjacent the inlet. The recess 27 in the bottom 25 extends to adjacent the end 24 of the crescent at the outlet of the pump. The recesses 26 and 27 extend under the teeth of the internal and external gears as illustrated in FIGS. 2 and 3. These recesses are for the purpose of lubricating the under face of the gear teeth as they travel from the inlet around the crescent to the outlet to insure lubrication under the gears where they engage the bottom 25 of the chamber 2.

As shown in FIG. 2 the bore 28 of the external gear 21 is provided with opposed arcuate segments 30 which provide the diametrically opposed key openings 31 between both ends of these segments. As illustrated these segments are recessed from the top and bottom surfaces of the external gear and the inner portion slopes downwardly providing a taper as illustrated in FIG. 2.

The tubular shaft 10 is provided with a pair of opposed abutments 32 which interengage in the key openings 31 and extend substantially to the upper surface of the segments 30 when the tubular shaft 10 fits the under inner bore 28 of the gear 21. The fit of this gear with the abutments 32 is not snug nor does the external surface of the tubular shaft 10 snugly fit the bore 28 of the gear 21. In other words, adequate clearance is provided between these members.

As shown in FIG. 3 the front pump cover plate 14 is provided with a series of holes 33 which mate with the bolted holes 13 in the flange 12 of the pump housing 1. The plate 14 is also provided with diagonally disposed holes 34 for receiving the guide pins 15. The plate 14 thus forms the other or closing face of the chamber 2 for the pump and is provided with an annular series of holes 35 for securing the plate and next adjacent member in the transmission which would be the manifold member forming a portion of the transmission which has a series of passages in its face for directing the oil to the proper channels in connecting this gear pump with the other parts of the transmission. The hole 39 in the cover plate 14 connects the sump 5 to the oil sump.

The arcuate openings 36 and 37 represent respectively the inlet and the outlet ports for the pump and as illustrated in FIG. 3 the inlet opening 36 is materially longer than the outlet port 37 and they both expose the teeth of the internal and external gears 18 and 21 respectively. It is not difficult to realize that the pump as shown in each of the figures rotates in a counter-clockwise direction because the liquid must be carried from the inlet between the spaces of the gear teeth and the abutting crescent 20 to the outlet position in order to create pumping action. The abutment formed in the plate 14 as indicated at 38 is that portion of the plate that covers the fully meshed position of the teeth between the internal and external gears and as indicated at 22 in FIGS. 5 and 2.

Figure 4:
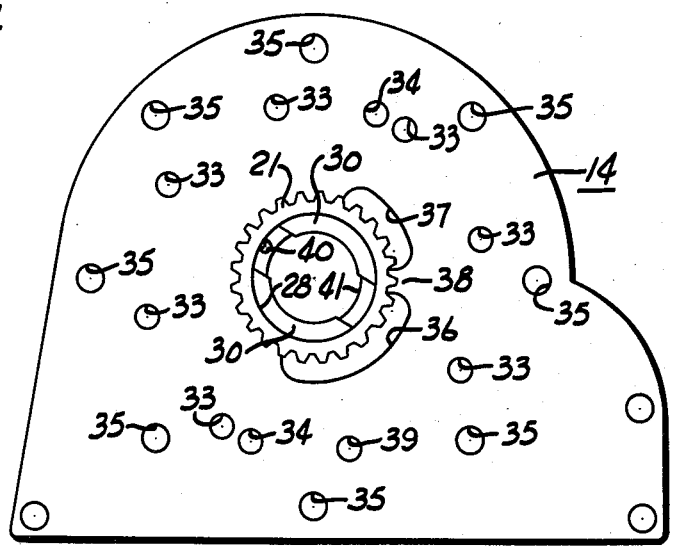
FIG. 4 is a plan view of the external gear positioned on the front pump cover plate.
Figure 7:
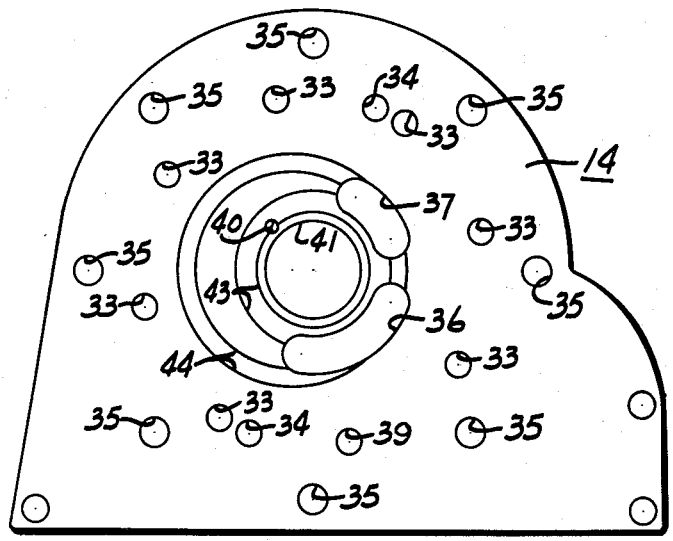
FIG. 7 is a plan view of a worn plate.

As shown in FIG. 4 an exhaust port 40 extends from adjacent the shaft opening 41 in the plate 14 to the opposite side of the plate 14 where it is vented by the manifold member on the opposite side of the plate 14. This exhaust port is ordinarily drilled diagonally at an angle so that the opposite side of the plate 14 places this port 40 at some distance from the shaft opening 41 so that it may be sealed between this exhaust port and the shaft opening on the opposite side of the plate as shown in FIG. 3. However, in FIG. 4 the opposite side of the plate 14 is illustrated with the old pump gear in position and without the tubular shaft so as to illustrate that the exhaust port 40 is fully opened within the bore 28 of the external gear 21 as shown in FIG. 4. This condition as illustrated in FIG. 4 causes the plate to wear as illustrated in FIG. 7. In FIG. 7 a deep groove is formed by the outer face of the external gear where it engages the plate 14 which closes the pump chamber 2. This wear in the plate 14 which is indicated at 43 in FIG. 7 will continue until it engages the arcuate sections 30 of the gear. However, at this time there is very little output obtainable from this gear pump. It will also be noted that the deepest worn spot in the worn circle 43 is adjacent the outlet port 37. However, the internal gear also shows wear, which wear is uniformly around the face of the plate as indicated at 44.

Referring now to FIG. 5 the external gear 21 is provided with a valve member 45 which is in the form of an annular ring, the perimeter 46 of which engages in the bore 28. The valve member 45 rests on top of the arcuate segments 30 and may be secured thereto by means of the rivet member 47. The inner hole 48 of the washer type valve member 45 may be substantially the same diameter as that of the inner edge of the arcuate segments 30 or slightly larger. Thus the face 50 of the valve member 45 will entirely cover the port opening of the exhaust port 40 which is indicated in dotted lines in FIG. 6. The washer type valve member 45 also extends over the abutment key members 32 but is spaced therefrom owing to the fact that these key members do not extend beyond the outer surface of the arcuate segments 30, as shown in FIG. 2.

The ring-like valve member 45 thus extends the end face of the external gear 21 and completely covers the outlet opening 40 of the exhaust port. This valve member 45 has, as shown in FIG. 5, two diagonally positioned grooves 51 and 52 which are actually valve ports. These grooves are merely arcuate slots radially disposed in the face 50 of the ring-type valve member 45 and when the external gear 21 is rotated these valve ports 51 and 52 will allow the oil flowing under pressure from the port 40 to exhaust through the port 51 or 52 whichever is in engagement with the exhaust port 40, and through the tubular shaft 10 forward to a converter. The discharge of leakage oil from around the tubular shaft 10 is through the groove 7 and the exhaust passage 6 and thence the hole 39 in the plate 14 to the sump.

By reason of the fact that there is a slight amount of clearance between the gears and the shaft 10 from which it is driven and between the gears and the side walls of the pump chamber the oil pressure from the port 40 is effective against the valve face 50 on the external gear to slightly raise the valve surface 50 from the face of the plate 14 which not only allows the oil to be discharged from the port 40 to the gear chamber, but also to distribute a certain portion of the lubricant underneath the gear and over the face 50 of the valve member 45. When the valve member 45 is provided with two valve grooves 51 and 52 it permits the gear to vibrate or float as it is rotating shifting into and out of engagement with the plate 14 thus keeping the surface well lubricated and preventing wear. By providing one or more of the grooves 51 and 52 one is enabled to prevent wear in the surface of the plate 14 and thus materially extend the life of the pump. As soon as the least amount of wear appears in the surface of the plate without this valve the pump begins to leak or short circuit itself, the oil merely flows from the outlet port 37 or the exhaust port 40 to the inlet port 36 and has to be operated at a very high speed in order to produce any work at all. Thus the valve 45 prevents any wear in the plate 14 and maintains the external gear 21 in a floating condition as it is rotated.

As illustrated in FIG. 6 the valve washer 45 completely covers the exhaust port 40 and prevents any leakage from the gear face to the bore of the external gear 21. Thus the bearing plate functions as a seal in this regard and also as a bearing surface which is particularly advantageous when the valve member 45 is made of bronze and the external gear member 21 is made of steel and the plate 14 is made of steel.

Figure 8:
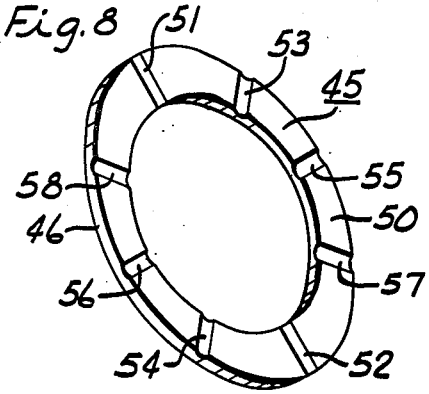
FIG. 8 is a perspective view of a modified form of valve.

In the structure shown in FIG. 8 the valve member 45 is provided with a plurality of valve ports of which there are eight in number as indicated at 51 to 58 inclusive. The depth of the valve grooves may be decreased when the number of valve grooves in the face 50 is increased. It is believed that when each valve groove registers with the exhaust port 40 the oil under pressure in attempting to escape alleviates some of this pressure through this valve groove and pulsates the gear relative to the surface of the plate 14 and the greater number of valve grooves the less the depth of each valve groove thereby regulating the pulsations of the gear as it rotates. In this manner the gear 21 substantially floats and prevents any wear on either the surface of the plate 14 or the bottom of the pump chamber 25.

An attempt to control this problem was made by reducing the size of the lubricant exhaust port 40, but this merely increased the pressure and starved the supply of oil to the converter causing trouble and thus the problem cannot be solved by regulating the size of the exhaust port 40.

It is necessary to have the lubricant periodically supplied between the face of the gear and the end walls such as the bottom surface 25 of the pump chamber 2 or the surface of the plate 14 and thus by producing a valve action in the discharge of the oil pressure by means of these ports in the valve member 45 and its radial valve ports 51 to 58 one is enabled to literally float the external gear between the side surfaces of the pump chamber and prevent any wear so that the pump will always produce the maximum pressure and will show no wear throughout its life.

I claim:

1. A gear pump valve consisting of a housing containing a pump chamber with one end wall, rotary driven interengaging gear means having a hub section encircling a bore and a tooth section and fitting said pump chamber to pump liquid, a plate closing said chamber to form the other pump chamber end wall, said walls engaging and sealing on the hub sections of said gear means, inlet and outlet ports in one of said walls and cooperating with the teeth of said gear means, an exhaust port in said wall between said inlet and outlet ports and adjacent to the hub section of said gear means to transmit fluid under pressure through the bore encircled by said hub section, and valve means carried by said hub section to cover said exhaust port and having valve ports connected with the bore of said gear means upon the rotation of said gear means whereby to float said hub section on the surface of said one wall.

2. The gear pump of claim 1 characterized in that said gear means includes an internal and external interconnected gear with a stationary crescent therebetween and said exhaust port is adjacent the hub section of said external gear.

3. The structure of claim 1 characterized in that said valve means in said hub section includes a bronze ring flush with the face of said gear means and said valve means includes a pair of diametrically exposed radial slots in the face of said bronze ring, said bronge ring functions as a thrust bearing for said gear means.

4. A valve for a front gear pump of an automatic transmission consisting of a housing containing an eccentrically disposed circular walled pump chamber with a back wall, an internal gear having its outer perimeter fitting said eccentric circular chamber, a crescent extending from said back wall and having an arcuate surface to form an abutment for the teeth of said internal gear, a rotary driven external gear having a hub face encircling its bore and teeth engaging the teeth of said internal gear and embracing the inner arcuate abutment face of said crescent, a front pump cover plate closing said gear chamber having inlet and outlet ports adjacent to the opposite ends of said crescent, an exhaust port in said plate between said inlet and outlet ports as said gears rotate and adjacent said hub face to transmit liquid under pressure through the bore encircled by said hub face, and valve means carried by said hub face to cover said exhaust port and having valve ports connected with the bore of said hub face upon the rotation of said gear in pumping operation whereby to float said hub face on the surface of said cover plate.

References Cited in the file of this patent

UNITED STATES PATENTS

| | | |
|---|---|---|
| 1,853,430 | Jensen | Apr. 12, 1932 |
| 2,159,720 | Wahlmark | May 23, 1939 |
| 2,405,061 | Shaw | July 30, 1946 |
| 2,650,544 | Parsons | Sept. 1, 1953 |
| 2,694,367 | Seavey | Nov. 16, 1954 |
| 2,787,963 | Dolan et al. | Apr. 9, 1957 |
| 2,940,399 | Zieg et al. | June 14, 1960 |
| 2,956,512 | Brundage | Oct. 18, 1960 |
| 2,998,783 | Lee | Sept. 5, 1961 |
| 3,008,425 | Chambers | Nov. 14, 1961 |
| 3,038,413 | Emeny et al. | June 12, 1962 |